Oct. 25, 1966 C. DIXON 3,281,592
JOURNAL BOX DETECTION APPARATUS
Filed March 25, 1963 3 Sheets-Sheet 1

INVENTOR.
CORBIN DIXON
BY Isidore Match
HIS ATTORNEY

Oct. 25, 1966 C. DIXON 3,281,592
JOURNAL BOX DETECTION APPARATUS
Filed March 25, 1963 3 Sheets-Sheet 2

INVENTOR.
CORBIN DIXON
BY Isidore Match
HIS ATTORNEY

Oct. 25, 1966   C. DIXON   3,281,592
JOURNAL BOX DETECTION APPARATUS
Filed March 25, 1963   3 Sheets-Sheet 3

INVENTOR.
CORBIN DIXON
BY Isidore Match
HIS ATTORNEY

United States Patent Office 3,281,592
Patented Oct. 25, 1966

3,281,592
JOURNAL BOX DETECTION APPARATUS
Corbin Dixon, Waynesboro, Va., assignor to General Electric Company, a corporation of New York
Filed Mar. 25, 1963, Ser. No. 267,523
2 Claims. (Cl. 246—169)

This invention relates to devices for inspecting railroad equipment. More particularly, it relates to arrangements for the detecting of over-heated journal boxes, i.e., so-called "hot boxes."

With the average length of non-stop runs for railroad rolling stock being continually extended and with the progressively increasing speeds at which such longer runs are being made, the opportunities for frequent inspection of journal boxes once afforded by the greater amount of stops at more closely spaced division points have greatly decreased. Concomitantly, these higher speeds and longer runs have created an increasingly severe working environment for the journal bearings on rolling stock. Furthermore, economic pressures to which railroads have been subjected have caused a reduction in the personnel employed by railroads for journal box inspection purposes. The railroads have, therefore, adopted methods for the detection of overheated journal boxes while trains are moving at high speeds, such apparatus permitting the existence of a greater spacing of stop points while maintaining the necessary high levels of safety during long non-stop runs at high speeds.

The aforesaid apparatus has generally involved the utilization of noncontacting arrangements for determining journal box temperature, a particular apparatus for this purpose detecting the different quantities of infrared radiation emitted by the surface of a journal box as a result of the changing temperatures thereof. Such detectors have generally employed for this purpose an infrared radiation detecting element such as a bolometer as well as other infrared sensitive devices. The detecting element has operated in association with a suitable optical system which has functioned to focus the infrared radiation. The amount of infrared radiation detected from a journal box surface is an indication of its temperature and has been widely adopted as an index to the temperature of the journal bearing itself.

In making the required observations, heretofore, it has been most preferred to locate the detecting element and its associated optical system as close as is possible to the path of travel of the journal boxes under inspection. This is desirable in order to increase the amount of infrared energy intercepted by an optical system of fixed dimension and to reduce the possible errors in temperature measurement which may be introduced by such extraneous phenomena as dust swept up in the slipstream of a moving train, rain, swirling snow, etc. However, the protection of railroad employees and equipment requires that any object located near railroad tracks conform to generally adopted clearance requirements. Of necessity, the latter requirements restrict the height at which the detection apparatus may be mounted since equipment which projects above such height may result in injury to the workers at the sides of railroad cars and locomotives or damage to the apparatus.

Another factor which determines the location of the detection apparatus is the selection of the portion of the journal box or other portions of a railroad car, truck, and wheel assembly which is to be used as a target. The ultimate area of interest is the interface of the bearing and journal as it is here where any defect which may exist appears and manifests itself by generating heat. Of course, this interface is not exposed such that it may be inspected directly. Therefore, it has been necessary to ascertain what external portions of the journal box or other portions of the truck and wheel assembly which are visible have temperatures which provide a reliable index of the temperature of the aforesaid interface. As a result of studies made by some railroads, it has been determined that one of the more desirable targets for a hot-box detector is the side of a journal box. The sides of the journal box are desirable because they have good mechanical contact with the aforesaid interface whereby thermal conduction is good, and because they are physically located near the interface. The close physical location presents the advantage that the difference in temperature between the target and the interface (the heat source) due to heat losses is held down.

When a detector is located to conform with the clearance requirements and the optical axis of its associated optical system intercepts the path of the sides of the passing journal boxes of the cars of a moving train, the projection of the axis intercepts the underside of the passing cars. Since the undersides may vary widely among themselves in temperature as is readily appreciated when there are considered the different structures and functions of the large variety of types of railroad cars in use such as box cars, flat cars, hopper cars, etc. and the effect thereon, for example, of the prolonged exposure to the summer sun or other weather and meterological phenomenon, etc.; consequently, the underside of a car presents a widely and uncontrollably varying background against which the delicate determination of journal box temperature variations have to be made. Furthermore, special type cars and/or special type conditions for loading may exist, such as for example, tank cars which may have very little overhang outward from the tracks or only an open catwalk and which may, on occasion, be filled with substances which require that they be kept hot to remain in the liquid state.

For a hot-box detecting system to accomplish its function, i.e., detecting journal box temperature and only journal box temperature, a salient point in the functioning of the system is that the indication of heat energy which is the output of the system is an indication of the heat of the journal box and not of any other heat radiating source. The detecting apparatus used provides an indication of the heat of the journal box by producing an electrical signal which represents the difference between the box heat and the heat of some reference or ambient. The apparatus presently in use which is located so as to scan the side of the journal box is constructed so that the infrared sensitive element has a portion which is continually exposed during the period of train passage; consequently, when the element is not focused on the side of a journal box, it is exposed to extraneous radiation including that from the underside of the cars. The result is that the heat indications produced by the apparatus are a representation of the difference between the box heat and the heat of the extraneous source including the undersides of the cars which, therefore, constitute the reference. It can be readily appreciated that with the various types of cars utilized, the types of freight hauled, the types of weather conditions encountered, and the types of other structures in the vicinity of the journal box that the underside of a car should not be used as a difference background, i.e., an "ambient" temperature reference, the temperature excursions from which indicate the temperature excursions of a journal box. To insure that the detection system is accomplishing its stated aim, it is desirable to prevent the underside of a car from influencing the operation of the detecting element and a more constant and reliable reference has to be utilized in its stead.

Accordingly, it is an important object of this invention to provide a journal box temperature detecting arrangement in which journal box temperatures in moving railroad cars are detected, such detected temperatures being substantially purely journal box temperatures uninfluenced by the temperatures of the environments in which the journal boxes are physically located.

It is another object to provide an arrangement in accordance with the preceding object in which the detecting system is prevented from being exposed to extraneous heat sources but is exposed to a constant and reliable reference during those periods that it is not exposed to a journal box.

It is a further object to provide a high speed shutter which is capable of going from the open to the closed and from the closed to the open positions in equally extremely short intervals, the shutter being of light weight and rugged to enable it to withstand long and frequent use without requiring maintenance or replacement.

In accordance with the invention there is provided in an overheated journal detector which includes an optical system, an infrared sensitive element and means for mounting the infrared sensitive element and the optical system near the ground adjacent a railroad track and for causing them to be aimed so that radiation from above may impinge upon the infrared sensitive element, a shutter interposed in the path of such radiation whereby this radiation impinges on the shutter when it is in one position. The shutter is formed so as to be rapidly movable. Means are also included for causing the shutter to be moved rapidly from the aforesaid one position to a second position in which the radiation may impinge upon the infrared sensitive element and to be moved rapidly from this second position to the aforesaid one position.

Also, in accordance with the invention, there is provided a shutter arrangement comprising balanced magnetic means wherein the magnetic means comprises an electromagnet actuable by an electric signal and a permanent magnet. An armature comprising two symmetrical portions is disposed adjacent and operatively associated with the electromagnet and is formed so that each of the portions of the armature travels equal distances toward respective opposite directions thereof, and a blade comprising a thin sheet of relatively rigid material, the permanent magnet serving to latch the armature at the termination of its movements and to provide magnetic flux.

The novel features, which are believed to be characteristic of this invention are set forth with particularity in the appended claims. The invention itself, however, both as to its organization and method of operation, together with further objects and advantages thereof, may best be understood by reference to the following description when taken in connection with the accompanying drawings.

In the drawings, FIG. 1 is a diagrammatic illustration of a "hot box" detection arrangement constructed in accordance with the principles of the invention;

Figure 1:
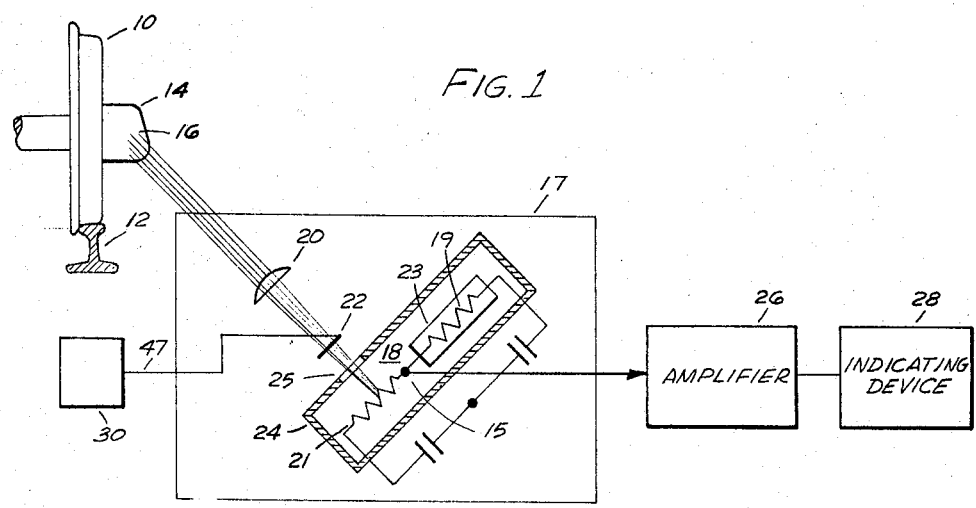

Referring now to FIG. 1, the structure 10 depicts the conventional railroad car wheel on a rail 12. The journal box 14 located on the outside of the wheel beyond the gauge line of the track encloses the journal bearing and axle, the sides of the journal box being generally of a rectangular configuration. When the journal bearing contained in the box becomes heated, the sides thereof such as a side 16 also become heated and consequently radiate infrared energy.

This infrared radiation is sensed by the detecting apparatus which is suitably positioned adjacent the track and mounted so that it can monitor the journal boxes on the cars of a moving train. The detecting apparatus functions to provide an indication as to whether the temperature of the journal bearing in a box has reached a level beyond a safe limit.

The detecting arrangement includes a housing 17 which has positioned suitably therein a heat energy detecting element 18 such as a thermistor bolometer or other suitable type of infrared detector. Associated with element 18 is an optical system generally designated by a lens 20, lens 20 consisting of a material such as germanium which is opaque to visible light but transparent to infrared radiation and a shutter 22. Shutter 22 is constructed in accordance with the principles of the invention to have the highest possible operating speed, i.e., its times for going from the open to the closed position and from the closed to the open position are both of extremely short duration, on the order of about one to two milliseconds. Detecting element 18 comprises two like portions 19 and 21, portion 19 being contained completely in a shielding housing 23. Both portions of detecting element 18, i.e., portion 21 and shielded portion 19 are contained in a housing 24. A window 25 which may consist of material similar to the material of lens means 20, such as germanium, i.e., opaque to visible light but transparent to infrared radiation is provided in housing 24 intermediate portion 21 and shutter 22. It is seen from this arrangement that portion 19 is shielded from any radiation at all times and that portion 21 is in the quiescent state (with shutter 22 in the closed position) exposed to that portion of the radiation emitted by the back of shutter 22 which passes through window 25.

Portions 19 and 21 comprise two legs in a bridge circuit. With shutter 22 in the closed position, the voltages across portions 19 and 21 are such as to be substantially equal and to oppose each other whereby a steady state signal is provided at point 15. In this connection it is to be realized that shielded portion 19 is substantially constantly at the temperature in housing 24. Shutter 22 may be at this temperature or at one below or above it. Of course, shutter 22 may be maintained at a desired operating temperature by suitable heating or cooling devices. For example, the shutter could be kept at a constant temperature by means which produces a hot or cold air stream and the like. However, to the extent that the shutter temperature influences the conductivity of portion 21, in the quiescent state, even though the voltage at point 15 is not zero, it is nevertheless a steady state voltage. Thus, when shutter 22 is actuated to the open position to expose only portion 21 to a passing journal box side, the signal appearing at point 15 is an excursion from the steady state signal, such excursion, of course, being caused by the change in resistivity in portion 21 upon exposure and the consequent unbalancing of the bridge. This signal may be amplified in a suitable amplifier 26 and the output of amplifier 26 may be utilized to actuate an indicating device 28 such as a pointer on a chart, etc. Alternatively the output of amplifier 26 can be compared with a reference voltage which represents a safe temperature and any voltage difference in a given direction resulting from such comparison may represent a temperature of a journal box which is "hot," i.e., above a safe limit. Such difference voltage can be utilized to actuate an indicating device which may be a visual or auditory alarm such as a red light, a bell, etc.

For actuating the shutter 22, i.e., synchronizing its opening with the moment that the optical axis of the optical system intercepts the portion of journal box face 16 which is to be scanned, there may be utilized the well known wheel pickup arrangement generally designated by stage 30. Such wheel pickup may consist of a permanent magnet which establishes a magnetic field and a coil of wire to sense changes in this field. This pickup is positioned adjacent to the track. As the wheel approaches pickup 30, the wheel flange changes the reluctance of the magnetic path so that a first voltage is induced in the coil in one direction to produce a first signal. Then as the wheel passes, the voltage swings sharply in the opposite direction to produce a second signal and then drops back to zero as the wheel moves away. It is this first signal which may be amplified, if necessary, that is utilized to actuate the shutter to the open position whereby the side of the journal box to be scanned falls into view on portion 21 of detecting element 18. The second signal then actuates the shutter back to the closed position. Since such pickups are well known in the art, no further description thereof is deemed necessary.

It is to be realized that the arrangement of FIG. 1 may be readily elaborated within the known background of the "hot box" detector art to provide counting schemes, etc. and thereby to insure the production of information which can make known to a human monitor, the presence of an unsafe journal bearing temperature. However, as has been stated hereinabove, the salient problem presented in "hot box" detection is the obtaining of a signal which precisely represents only the variations in journal box temperature, i.e., a signal that is not modified by heat radiating sources adjacent the journal box, by vagaries in atmospheric conditions, the type of railroad vehicle structure, the type of material being handled, etc.

With the arrangement of FIG. 1, shutter 22 serves to prevent any extraneous radiation from reaching portion 21 in the quiescent state, its own radiation provides a reliable and constant ambient reference in such steady state and its ability to go from the open to closed and from the closed to open position in equally extremely short intervals insures that the journal box side and only the journal box side is scanned when the shutter is in the open position. Thus, the arrangement of FIG. 1 overcomes the aforestated problem.

Figure 2:
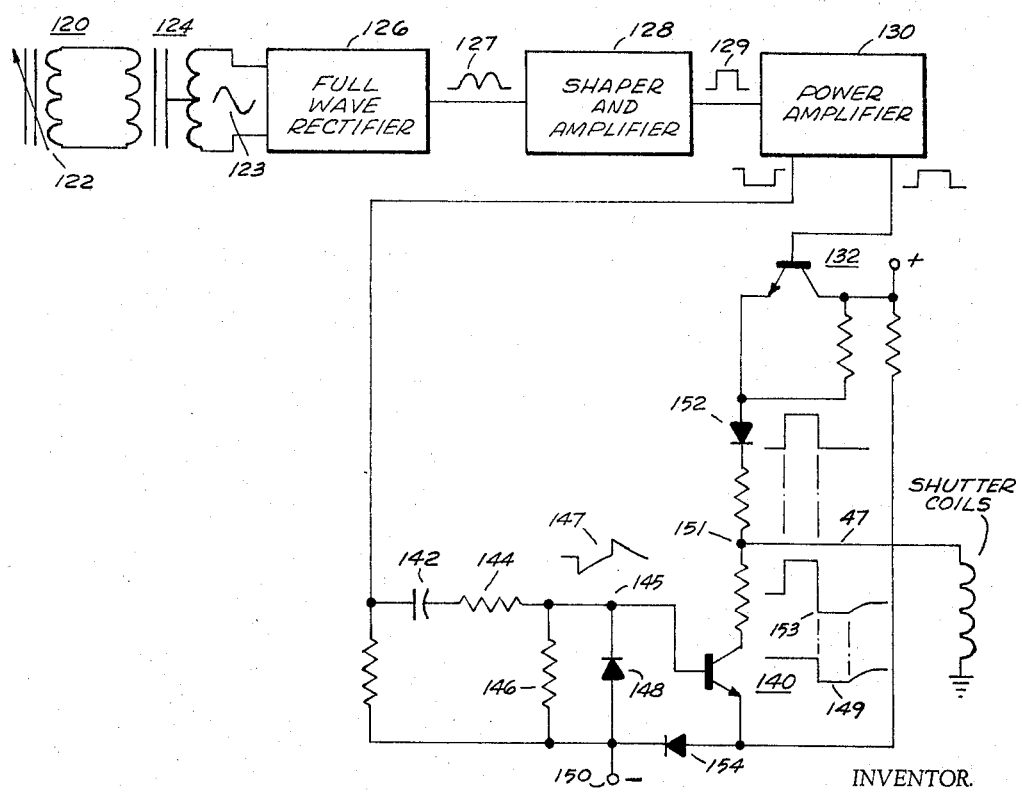
FIG. 2 is a schematic depiction of an illustrative embodiment of the wheel pickup operatively associated with the shutter, as shown in FIG. 1.

In FIG. 2 wherein there is shown an illustrative embodiment of the wheel pickup arrangement 30, FIG. 1, a magnetic pickup device 120 is included which senses the presence of a train wheel by providing a suitably located air gap in a magnetic circuit. Such circuit produces a flux change in response to the reluctance change cause by the presence of the train wheel in the vicinity of the air gap. This flux change is detected by a coil 122 linking the magnetic path and thus producing an induced voltage signal, such signal substantially having the configuration of a cycle of a sinusoidal wave, i.e., having a positive going portion and a negative going portion as shown at 123. The signal is applied to a full wave rectifier 126 through a transformer 124, the full wave rectified output of rectifier 126 having the shape of the signal shown at 127. This signal is shaped to a substantially rectangular pulse and amplifier in a shaper and amplifier stage 128 to produce a positive rectangular signal as shown at 129. The output of stage 128 is power amplified in a power amplifier stage 130 which provides a double ended output having like positive and negative pulses. The positive pulse is applied as an input to a transistor 132 connected as an emitter follower whereby at the emitter of transistor 132 there is produced an amplified positive current pulse. The negative pulse output of power amplifier 130 is applied to a transistor 140 through a differentiating circuit comprising a series connected capacitor 142 and resistor 144, and a parallel connected resistor 146. Consequently, at junction point 145, there appears the signal shown at 147 resulting from the differentiation of the negative pulse output of power amplifier 130. The cathode to anode path of a diode 148 connected between the base of transistor 140 and negative potential source 150 functions to clip the negative going portion of signal 147 whereby there is applied to transistor 140 only the second half, i.e., the positive going portion of the latter signal. Transistor 140 has biasing potentials applied thereto such that it operates substantially in the saturated mode. Consequently, at the output of the collector of transistor 140, there is produced the pulse having the configuration such as shown at 149. The output appearing at the emitter of transistor 132 and at the collector of transistor 140 are combined at junction point 151 to produce the signal shown at 153. This is the signal which is applied to the coils of the shutter arrangement to cause the shutter blade first to move in one direction and then to move in the opposite direction. Diode 152 is included to remove any negative component at the output of the emitter of transistor 132 and diode 154 is included to negatively clamp the potential at the emitter of transistor 140 to the potential from negative source 150. The lead from junction 151 may correspond to lead 47 in FIG. 1.

Figure 4:
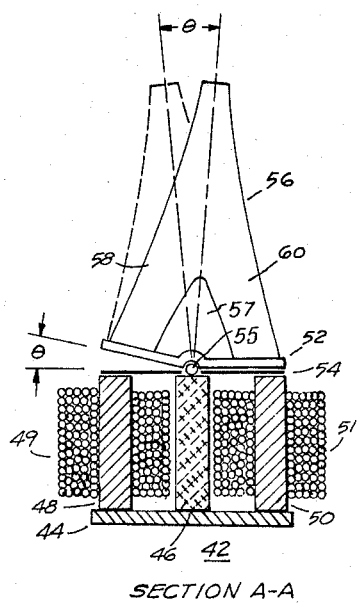
FIG. 4 is a sectional view taken along lines A—A of FIG. 3.
Figures 3, 5:
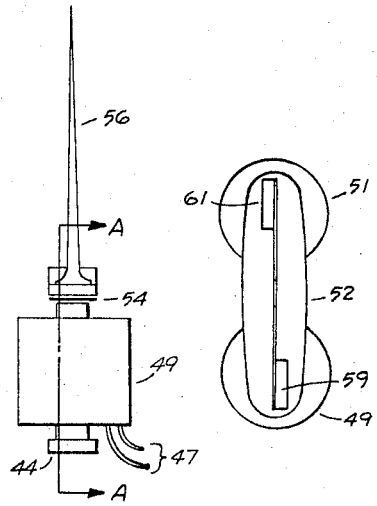
FIG. 3 is a side elevation of an illustrative embodiment of a shutter arrangement constructed in accordance with the principles of the invention and utilizable in the arrangement of FIG. 1.
FIG. 5 is a plan view of the shutter means of FIG. 3.

Referring now to FIGS. 3 to 5, wherein there is shown a first illustrative embodiment of the shutter arrangement 22 of FIG. 1, the actuating element thereof comprises a pole structure 42 which includes a rectangular base 44 to which there are affixed and disposed in vertical parallel array, a centrally disposed cylindrical pole 46 which consists of a permanent magnetic material and lateral poles 48 and 50. Poles 48 and 50 are the pole pieces for coils 49 and 51, permanent magnet 46 being located in the space between the outer circumferential surfaces of coils 49 and 51. The actuating signals to coils 49 and 51 may be provided, for example, on lead 47 which may be from pickup 30 in FIG. 1.

The armature 52 which is caused to travel by the actuated electromagnets comprises a structure which is quasi-rectangular in its plan aspect, i.e., slightly octagonal as shown in FIG. 5. In its elevational aspect, it is slightly V shaped, the angle of the V being a little less than 180°. A shim or a shim arrangement 54 which suitably consists of a nonmagnetic material is disposed between the upper ends of poles 48 and 50 to provide a suitable reluctance gap between armature 52 and the pole pieces and also to absorb some of the impact energy produced by movement of the armature. Thereby any tendency for the armature and the shutter blade to bounce is minimized. A bearing is disposed in the center of shim 54 and affixed to pole 46, a concave notch 55 in armature 52 permitting the armature to travel to and fro on this bearing.

The shutter blade 56 consists of a thin metallic sheet, approximately one thousandth of an inch thick, of magnetic material which may stippled or embossed to enhance its stiffness. To lighten its weight, it may also be foraminated. Shutter blade 56 may be of a truncated triangular configuration with a relatively narrow apical angle. A triangular notch 57 may be provided in its base to enable a still further weight reduction thereof. As seen in FIG. 5, tabs 59 and 61 are provided affixed to or integral with legs 58 and 60 respectively to enable the attachment of the shutter blade 56 to armature 52. Such attachment may be made by soldering, welding, or other known suitable metal or other bonding techniques.

In the operation of the shutter means of FIGS. 3 to 5, the actuation of the electromagnetic structure comprising coils 49 and 51 and their associated pole pieces 48 and 50 causes movement of armature 52 and consequently movement of shutter blade 56. The armature, when caused to move, travels an angular distance equal to angle $\theta$. Consequently, the apical portion of shutter blade 56 also moves angularly an amount equal to angle $\theta$ but since the arms of its angle of movement are much longer than that of half of armature 52, the actual distance traveled by this apical portion is several times the distance traveled by the armature, the multiplication factor being a function of the length of shutter blade 56 and the length of half of armature 52. Thus, if the total angular armature movement at an end is from 1/32" to 1/16" and if the shutter blade is four times the length of half of the armature, then the apical end of shutter blade 56 moves from 1/8 to 1/4 of an inch. The value of angle θ depends upon the V angle of the armature, the thickness of shim 54 and the heights of poles 48 and 50. The dotted outline of shutter blade 56 in FIG. 4 shows it in the opposite position at the termination of armature movement. Once blade 56 has terminated its movement, permanent magnet 46 serves to keep it latched in this terminal position. Permanent magnet 46 also serves to provide a steady state magnetic flux level whereby the time to actuate the electromagnets to an operating point is substantially minimized.

The shutter arrangement of FIGS. 3 to 5 may be designated as an impulse actuated bi-stable element which utilizes a permanent magnet to produce and maintain the magnetic field required to anchor the armature once it has completed its travel upon actuation. This shutter means presents the following advantages:

(1) The time of transfer or travel is the same in either direction. There are no springs required which have to be compressed and thereby to absorb any of the energy which is utilized to drive the shutter in the area subtended by the optical system. It is, of course, realized that springs may be included to stabilize the bringing of the shutter blade to a rest position substantially at its terminus of travel in a given direction once it has moved out of such subtended area. Shim arrangement 54 may function as such stabilizing spring. This permits the amount of work done by the shutter to be entirely dependent on an electrical driving signal.

(2) External electrical power is required only for its actuation. The shutter means may be constructed to have a design point transfer time which is less than one millisecond and since its movement is essentially due to snap or toggle action, the time of external actuation may be much less than its transfer time. The permanent magnet exerts a considerable force on armature 52 to prevent its moving because of vibration and shock and consequently no external holding power is required.

(3) Because no external magnetic field has to be established or other force provided, the speed of operation is determined essentially by the mass of the armature 52, shutter blade 56 and the inductance of actuating coils 49 and 51.

(4) The shutter blade has a balanced and symmetrical configuration. This configuration results in the minimization of bounce in the moving parts thereof thereby contributing to its long life.

(5) The configuration of the shutter blade lends itself to almost any degree of damping by metallic shims. In this latter connection, shim 54 may be either of the folded or oil filled type to provide desired damping. It has been found that generally one or two stainless steel shims of approximately .001 inch thickness are satisfactory.

It is appreciated that shutter blade 56 can travel a comparatively long distance, a typical distance being 1/4 inch. To enable such long travel distances and at the same time maintain optimum flux distribution in the magnetic circuit, the mass of the shutter blade desirably is quite low. Shutter blade 56, accordingly, may consist of steel about .002 inch thick or of beryllium-copper alloy. As has been stated hereinabove, it is preferably stippled, embossed or flanged to lend it desired stiffness. Its weight can be further reduced by constructing it from a foraminated metal sheet. This will enable a very small weight therefor such as about 0.1 gram.

Figure 6:
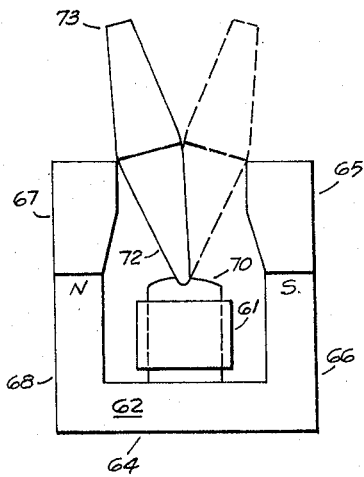
FIGS. 6–10 are depictions of other embodiments of shutter means constructed in accordance with the principles of the invention.

In FIG. 6 wherein there is shown a second embodiment of a shutter arrangement constructed in accordance with the principles of the invention, the actuating coils 61 are mounted on the linking leg 64 of a U shaped permanent magnet 62. A pole face and armature support 70 is of an inverted V configuration and the apex of a triangular armature 72 is fixedly attached in a concave notch at the angle of the V. A shutter blade 73 is suitably bonded to armature 72. The base of armature 72 and shutter blade 73, i.e., the vicinity of the bond moves from one pole to the other of permanent magnet 62 upon actuation of armature 72. In the structure of FIG. 6, the assembly of armature 72 and shutter blade 73 could be replaced with a hollow magnetic ball and sections 65 and 67 of permanent magnet 62 could be made concentrically concave to conform with the circumference of the ball.

Figure 7:
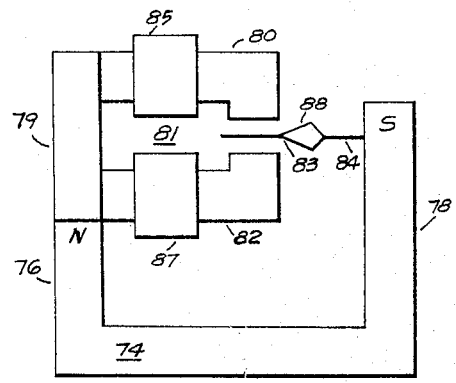

In FIG. 7 wherein there is shown a third embodiment of a shutter arrangement constructed in accordance with the principles of the invention, one pole leg 76 of a U shaped permanent magnet 74, designated for convenience as the north pole in the figure is shorter than the other pole leg 78. The pole piece 79 of the electromagnetic section 81 rests on the shorter leg 76 and the coil pole pieces 80 and 82 project from pole piece 79 at a 90° angle, the ends of pole pieces 80 and 82 having inwardly extending portions defining a comparatively narrow gap 83 therebetween. The armature 84 is attached to permanent magnet leg 78, the south pole in FIG. 7, and actuation of the coils 85 and 87 causes the end of armature 84 to travel therebetween. The shutter blade 88 is mounted on armature 84 and is disposed to move in the space defined by the ends of pole pieces 80 and 82 and leg 78.

Figure 8:
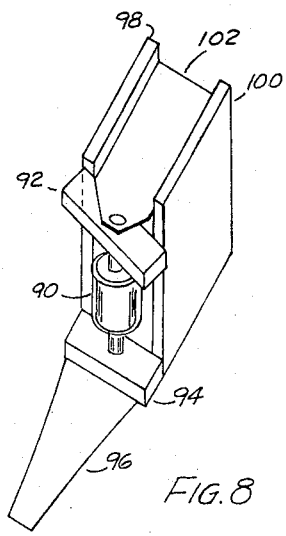

FIG. 8 shows an embodiment of a shutter arrangement constructed in accordance with the principles of the invention wherein the actuation of the electromagnetic structure in one direction causes a rotary movement of coil 90 and a consequent movement of respective armatures 92 and 94. The shutter blade 96 which is attached to armature 94 travels as a consequence of such armature movement. Rectangular structures 98 and 100 are the electromagnet structure pole pieces and element 102 is the permanent magnet.

Figure 9:
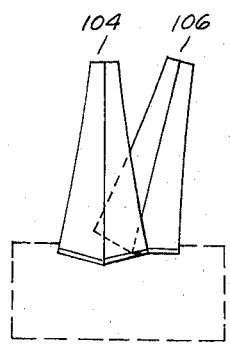

In FIG. 9, there is shown a dual shutter blade arrangement. In this embodiment, the shutter blades 104 and 106 are of a substantially truncated right triangular configuration. For simplicity in visualization and explanation, the driving elements for the shutter blades have been omitted from FIG. 9. To actuate shutter blades 104 and 106, each blade would require to have operatively associated therewith an actuating arrangement such as comprised by permanent magnet 46, pole pieces 44, 48 and 50, coils 47 and 51 and shim 54 in the structure of FIGS. 3 and 5. With the dual blade arrangement of FIG. 9 plus a respective driving element for each blade, then a scissors type action would be provided, such action enabling fast and long travel of the shutter blades.

Figure 11:
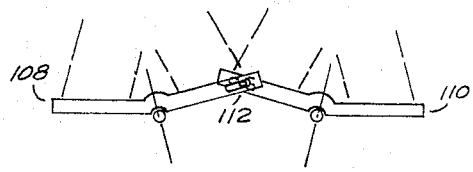
FIG. 11 is a diagram of an armature arrangement utilizable with the shutter means of FIG. 3.

Instead of two actuating elements, the linked armature arrangement of FIG. 11 can be utilized to drive the blades of FIG. 9. It is seen in FIG. 11 that a first armature 108 drives a second armature 110 through a linkage pin 112 which rides in registered slots at the respective ends of the armatures.

Figure 10:
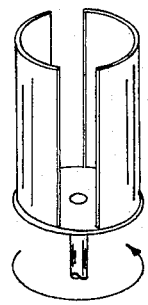

In FIG. 10, there is shown a differential rotary type shutter arrangement constructed in accordance with the pinciples of the invention. In this embodiment, the shutter blade is cylindrical and has circumferential portions cut out therefrom as shown. Such blade is utilized with a rotating actuating element that has a reciprocating movement and as the shutter blade is rotated due to such movement, the light path through the openings is occluded.

In FIGS. 3 to 11 there have been illustrated various types of shutter means including respective actuating elements for their shutter blades. It is to be realized that within the contemplation of this invention, it is not intended to be limited to only these elements and that other arrangements for actuating a shutter are also included with such contemplation. Such other arrangements may be, for example, the movement of an electric meter, the movement of an oscilloscope, a speaker element, a magnetostrictive device, a Kerr cell, the pressing together of two prisms with a sharp blow, etc.

While there have been shown particular embodiments of this invention, it will, of course, be understood that it is not wished to be limited thereto since different modifications may be made both in the circuit arrangements and in the instrumentalities employed, and it is contemplated in the appended claims to cover any such modifications as fall within the true spirit and scope of the invention.

What is claimed as new and desired to be secured by Letters Patent of the United States is:

1. In an overheated journal detector including an optical system, an infrared sensitive element and means for mounting the infrared sensitive element and the optical system near the ground adjacent a railroad track and for causing them to be aimed so that radiation from above may impinge upon the infrared sensitive element, the improvement comprising a shutter adapted to be actuated by an electrical signal interposed in the path of such radiation whereby such radiation impinges on said shutter when it is in one position, said shutter being formed so as to be rapidly movable, magnetic pickup means comprising a magnetic circuit having an air gap and responsive to the movement of a railway car wheel, when the side of a bearing housing associated with said wheel is in position whereby the radiation therefrom will impinge upon the infrared sensitive element, toward said gap for producing an electric signal, means in circuit with said pickup means for deriving from said signal a signal having substantially a positive and a negative going portion, and means for applying said derived signal to said shutter to cause said shutter to be moved rapidly from said one to a second position responsive to one of said signal portions and to be moved rapidly from said second position to said one position responsive to the other of said signal portions so that only radiation from the sides of a passing bearing housing is permitted to impinge on said infrared sensitive element, said shutter means comprises electromagnetic means including a pair of like coils disposed adjacent to and spaced from each other, a V shaped armature having arms of equal lengths operatively associated with said coils and so disposed whereby each of said arms move in respective opposite angular directions toward one of said coils upon excitation of said coils, each of said arms being caused to move upon alternate excitation of said coils, a blade comprising a sheet of thin material affixed to said armature, and a permanent magnet in magnetic relationship with said armature to latch said armature upon the termination of its movements in said opposite directions and to establish a steady state magnetic flux.

2. In an overheated journal detector including an optical system, an infrared sensitive element and means for mounting the infrared sensitive element and the optical system near the ground adjacent a railroad track and for causing them to be aimed so that radiation from above may impinge upon the infrared sensitive element, the improvement comprising a shutter adapted to be actuated by an electrical signal interposed in the path of such radiation whereby such radiation impinges on said shutter when it is in one position, said shutter being formed so as to be rapidly movable, magnetic pickup means comprising a magnetic circuit having an air gap and responsive to the movement of a railway car wheel, when the side of a bearing housing associated with said wheel is in position whereby the radiation therefrom will impinge upon the infrared sensitive element, toward said gap for producing an electric signal, means in circuit with said pickup means for deriving from said signal a signal having substantially a positive and a negative going portion, and means for applying said derived signal to said shutter to cause said shutter to be moved rapidly from said one to a second position responsive to one of said signal portions and to be moved rapidly from said second position to said one position responsive to the other of said signal portions so that only radiation from the sides of a passing bearing housing is permitted to impinge on said infrared sensitive element, said shutter means comprises electromagnetic means including a pair of like spaced coils, said coils including respective magnetic pole pieces in substantially parallel array, a permanent magnet intermediate said coils and in parallel arrangement with said pole pieces, a bearing on said permanent magnet, a shim consisting of a thin nonmagnetic material slightly spaced from said pole pieces and having an opening therethrough for receiving said bearing, a V shaped armature having arms of equal lengths and having a concave notch at its angle, said bearing received in said notch, each of said arms being caused to move angularly in respective opposite directions upon alternate excitation of said coils, and a blade consisting of a thin material affixed to said armature, said permanent magnet operating to latch said armature upon terminations of respective movements and to establish a steady state magnetic flux.

References Cited by the Examiner

UNITED STATES PATENTS

| Re. 24,983 | 5/1961 | Gallagher et al. | 246—169 |
| 2,856,539 | 10/1958 | Orthuber et al. | 246—169 |
| 2,880,309 | 3/1959 | Gallagher et al. | 246—169 |
| 2,973,430 | 2/1961 | Pelino | 246—249 |
| 3,086,108 | 4/1963 | Kaehms | 246—169 |

FOREIGN PATENTS

| 603,961 | 6/1948 | Great Britain. |
| 836,273 | 6/1960 | Great Britain. |

OTHER REFERENCES

Orthuber et al.: German application 1,005,876, printed April 4, 1957 (KL: 74b, 5 pgs. spec., 2 shts, drwgs.).

ARTHUR L. LA POINT, *Primary Examiner.*

S. T. KRAWCZEWICZ, *Assistant Examiner.*